United States Patent
Hofbauer et al.

(10) Patent No.: US 10,621,006 B2
(45) Date of Patent: Apr. 14, 2020

(54) METHOD FOR MONITORING THE USE CAPACITY OF A PARTITIONED DATA-PROCESSING SYSTEM

(71) Applicant: zCOST MANAGEMENT, Saint-Herblain (FR)

(72) Inventors: Jacky Hofbauer, Le Turballe (FR); Bruno Koch, Le Bouscat (FR); Christophe Chevereau, Avrille (FR)

(73) Assignee: zCOST MANAGEMENT, Saint-Herblain (FR)

(*) Notice: Subject to any disclaimer, the term of this patent is extended or adjusted under 35 U.S.C. 154(b) by 155 days.

(21) Appl. No.: 15/765,069

(22) PCT Filed: Sep. 21, 2016

(86) PCT No.: PCT/FR2016/052386
§ 371 (c)(1),
(2) Date: Mar. 30, 2018

(87) PCT Pub. No.: WO2017/055708
PCT Pub. Date: Apr. 6, 2017

(65) Prior Publication Data
US 2018/0293109 A1    Oct. 11, 2018

(30) Foreign Application Priority Data
Sep. 30, 2015    (FR) .................................... 15 59255

(51) Int. Cl.
*G06F 9/46*    (2006.01)
*G06F 9/50*    (2006.01)

(52) U.S. Cl.
CPC .......... *G06F 9/5077* (2013.01); *G06F 9/5027* (2013.01); *G06F 9/5083* (2013.01)

(58) Field of Classification Search
CPC ............................ G06F 9/5077; G06F 9/5083
(Continued)

(56) References Cited

U.S. PATENT DOCUMENTS

| 7,007,276 B1 | 2/2006 | Kubala et al. |
| 7,096,469 B1 | 8/2006 | Kubala et al. |

(Continued)

OTHER PUBLICATIONS

International Search Report for International Application No. PCT/FR2016/052386 dated Nov. 7, 2016, 3 pages.
(Continued)

*Primary Examiner* — Camquy Truong
(74) *Attorney, Agent, or Firm* — TraskBritt

(57) ABSTRACT

A method for monitoring the use capacity of a partitioned data-processing system, the system being configured to have a plurality of logical partitions sharing common physical resources, involves limiting access to the processor resources of partitions $P_i$ in accordance with the value of the parameters $DC\_P_i(t)$ for setting an upper limit on the capacity of each of the partitions $P_i$, which are variable over time and are recalculated periodically. The values $DC\_P_i(t)$ are recalculated periodically in accordance with: the result $NICRP(t)$ of measuring the instantaneous consumption level of the processor resources of all the partitions $P_i$; the result $NICT_i(t)$ of measuring the instantaneous workload level of each of the partitions $P_i$; the upper limit state of each of the partitions $P_i$; and at least one "$K_{user}$" parameter determined by the user.

16 Claims, 3 Drawing Sheets

(58) Field of Classification Search
USPC .......................................................... 718/104
See application file for complete search history.

(56) References Cited

U.S. PATENT DOCUMENTS

| | | |
|---|---|---|
| 7,752,419 B1 | 7/2010 | Plunkett et al. |
| 8,015,335 B2 | 9/2011 | Farrell et al. |
| 8,904,405 B1 | 12/2014 | Peeters et al. |
| 2008/0244215 A1 | 10/2008 | Flemming et al. |
| 2013/0055277 A1 | 2/2013 | Ashish et al. |
| 2014/0373010 A1 | 12/2014 | Folco et al. |
| 2016/0212061 A1* | 7/2016 | Birkestrand ............ H04L 67/10 |

OTHER PUBLICATIONS

International Written Opinion for International Application No. PCT/FR2016/052386 dated Nov. 7, 2016, 5 pages.
Mlynski, Maciej, The analysis of Influence of IBM pSeries Servers' Virtulaization Mechanism on Dynamic Resources Allocation in AIX 5L, Parallel and Distributed Computing, 2008., International Symposium on, IEEE, Jul. 1, 2008, pp. 39-46 (abtract only).

\* cited by examiner

METHOD FOR MONITORING THE USE CAPACITY OF A PARTITIONED DATA-PROCESSING SYSTEM

CROSS-REFERENCE TO RELATED APPLICATIONS

This application is a national phase entry under 35 U.S.C. § 371 of International Patent Application PCT/FR2016/052386, filed Sep. 21, 2016, designating the United States of America and published as International Patent Publication WO 2017/055708 A1 on Apr. 6, 2017, which claims the benefit under Article 8 of the Patent Cooperation Treaty to French Patent Application Serial No. 1559255, filed Sep. 30, 2015.

TECHNICAL FIELD

This application relates to the field of computer servers with high processing capacity and high availability, generally shared between a plurality of information systems, designated by the term "logic partitions" (LPAR). These servers comprise physical resources such as memory and processors. These servers are parameterized so as to optimize the sharing of these resources between the various logic partitions and to achieve a level of performance expected for each of these partitions. The system administrator allocates portions of the memory to each logic partition (LPAR). An internal load-balancing algorithm provides the distribution of the allocation of the processors to the various logic partitions.

BACKGROUND

U.S. Pat. No. 7,752,419 describes a method and system for controlling the use of the capacity of a logically partitioned data processing system, comprising physical resources that are shared between a plurality of logic partitions, in which the capacity of the logic partitions is managed so as to control the consumption of the physical data processing resources.

U.S. Pat. No. 7,096,469 describes a method for imposing capacity ceilings such as those imposed by the software license agreements in an information processing system in which a physical machine is divided into a plurality of logic partitions, each of which is allocated a defined portion of resources of the processor by a logic partition manager.

A software license manager specifies a maximum authorized consumption of the resources of the processor by a program being executed in one of the logic partitions.

A workload manager also being executed in the partition measures the actual consumption of the processor resources by the logic partition over a specified average calculation interval and compares it with the authorized maximum consumption.

If the actual consumption exceeds the authorized maximum consumption, the workload manager calculates an upper limit ("soft capping") and interacts with the logic partition manager in order to set a ceiling on the actual consumption of the resources of the processor by the partition in conformity with the calculated limit.

In order to provide additional flexibility, the partitions are assigned a phantom weight that the logic partition manager adds to the total weight of the partition in order to determine whether the partition has exceeded its authorized share of processor resources in the context of setting a ceiling on the resources.

For software under license, the logic partition thus becomes a "container" having a processing capacity less than that of the whole of the machine.

U.S. Pat. No. 8,015,335 describes a logically partitioned host computer system comprising host processors (host CPU) divided into a plurality of host processors (host CPU) of a host configuration and an instruction function topology executed by a host processor specifying a change in topology of the guest configuration.

The change in topology preferably changes the polarization of host processors, the polarization related to the quantity of a host CPU resource is supplied to a host processor.

U.S. Pat. No. 8,904,405 relates to a server, the partitioned data processing system of which is divided into a plurality of logic partitions.

In a system and a method such as the management of a computer system, each task in the course of execution of a workload that can be classified on the basis of the criticality of the time, and the groups of logic partitions can be defined freely.

The processing capacity limits for the logic partitions in a group of logic partitions are based on defined processing capacity thresholds and on an iterative determination of the capacity necessary for the tasks of the workload with critical duration.

The workload may be balanced between the logic partitions in a group in order to prevent the surplus processing capacity being used to execute the critical workload, not the time on a logic partition when another logic partition executes only the tasks of the critical-duration workload when faced with a processing deficit.

U.S. Patent Application Publication No. 2014/0373010, which does not relate to the field of the present disclosure, discloses a resource management system for virtual machines.

According to this solution of the prior art, a computer receives information associated with one or more virtual machines, comprising use and workload information associated with each virtual machine of one or more virtual machines. In the solution described, the computer analyzes the received information associated with one or more virtual machines and determines the virtual machines for reallocation of resources.

This solution relates to a particular context, specific to the AIX (the acronym of Advanced Interactive eXecutive) operating system oriented toward the virtualization of the processors, disks and network.

The purpose of the solution described in this document is control of the performance on another platform rather than control of the capacity of use of a partitioned system in order to limit access to the processor resources of the partitions $P_i$ according to the value of parameters $DC\_P_i(t)$ for setting a ceiling on the capacity of each of the partitions.

U.S. Patent Application Publication No. 2013/0055277 discloses a data processing system for load management and balancing in a plurality of systems managed in a logic partitioning data processing system. In response to a critical logic partitioning requiring additional resources, the mechanism determines whether one or more managed systems have resources available for satisfying the resource requirements of the critical partition. The mechanism performs at least one separation migration operation in order to move at least one logic partition between the managed systems in response to the determination that one or more managed systems have resources for satisfying the resource requirements of the critical partition. The mechanism performs at least one dynamic logic partition operation in order to allocate resources to at least one of the one or more critical logic partitions reacting to the execution of the operation of the at least one partition migration.

This document also does not concern the dynamic management of the parameter limiting access to the partition resources of the server.

U.S. Patent Application Publication No. 2008/244215 describes a solution for balancing access between a plurality of logic partitions on the resources of the physical system of a computer system by using system virtualization. Each of the logic partitions is classified, first of all during a start-up period, according to a level allocated to the use of the dispatch window. The performance measurements of one or more of the resources of the physical system are determined in association with one or more logic partitions. The performance indicators are determined at a level independent of the hardware programming interruptions.

This is a simple general technological background, affording no teaching concerning the dynamic management of the parameters for limiting access to the resources of the partitions.

U.S. Pat. No. 7,007,276 relates to an example of management of groups of partitions of a data processing environment, comprising the modification of a composition of a group of a plurality of partitions of the data processing environment and dynamic modification of a sharable resource allocated to their group, usable simultaneously by a plurality of partitions.

In the solutions of the prior art, the sharing of the resources between each of the partitions does not make it possible to ensure satisfactory performance under all conditions of use. For example, to satisfy a very high and transient exceptional requirement for resources, the server must be parameterized according to the peak consumption induced, which leads to oversizing the server and, therefore, to increasing the complexity of the hardware means, and the power consumption and heating produced by the server, until the functioning of the server is seriously degraded.

The solution proposed by U.S. Pat. No. 8,904,405 uses a method for limiting the resources in each of the partitions, depending on parameters taking into account the prioritization and the classification of the workloads, which are determined by automatic processing operations executed by the work task management program. These data thus calculated are not completely relevant for ensuring optimization of the consumption of resources. For example, if the partition is limited to a given capacity according to information collected from the task manager, in a situation where many tasks are classified as "non-priority," the allocation of resources will be falsified. This is because the task manager is based on the available resources and on all the tasks the execution of which it must ensure (whatever their priority) in order to ensure correct execution and prioritization of these tasks. In the solutions of the prior art, the resource management policy is determined automatically solely by the task manager (WLM), which controls the execution of non-priority tasks according to the available resources, having regard to the overall setting of a ceiling on the consumption of the resources determined for all the work tasks of the partition.

BRIEF SUMMARY

In order to respond to these drawbacks, the present disclosure relates, in its most general acceptance, to a method for controlling the capacity of use of a partitioned data processing system, or server, the system being configured to have a plurality of logic partitions sharing common physical resources, the method consisting of limiting access to the processor resources of partitions $P_i$ according to the value of parameters $DC\_P_i(t)$ for setting a ceiling on the capacity of each of the partitions $P_i$ that are variable over time, characterized in that the values $DC\_P_i(t)$ are recalculated periodically according to:

the result $NICRP(t)$ of measurement of the instantaneous level of consumption of the processor resources of all the partitions $P_i$, the result $NICT_i(t)$ of measurement of the instantaneous level of the workloads of each of the partitions $P_i$, the state of placing a ceiling on each of the partitions $P_i$, and at least one parameter "$K_{user}$" determined by the user.

The disclosure makes it possible to optimize the sharing of the computer resources in a mainframe environment.

In the remainder of the patent, the "partitioned system" designates a computer, generally a server, comprising one or more hard disks organized in a plurality of partitions in which the operating systems present on a machine can manage their information therein in a separate and private manner.

The computers preferably use the z/OS file system of IBM (trade names), which manages the files with a catalogue but also non-hierarchical system without file directories or trees for the dsn identifiers. The files are identified by the dsn identifier, an acronym signifying "data set name." A dsn identifier is composed of a plurality of qualifiers (no more than 8 characters long) connected by a full stop, the first of which (HRQ) is generally defined as "alias" in a catalogue. It may be supplemented by the second and third, and multilevel alias that is spoken of.

A name of a file represents a string of characters (maximum 44) separated by full stops. This novel way of determining the variables $DC\_P_i(t)$ makes it possible to fix a ceiling on the partitions while reducing the constraints imposed on the resource consumption of these partitions.

This limitation is, according to a variant, framed by minimum and maximum values at a logic partition and/or groups of logic partitions, at the partitioned system and at the group of partitioned systems.

Advantageously, calculation of the values $DC\_P_i(t)$ is also dependent on the prior value $DC\_P_i(t-n)$. According to a variant, calculation of the values $DC\_P_i(t)$ is also dependent on the change in N values $NICRP(t)$.

According to another variant, calculation of the values $DC\_P_i(t)$ is also dependent on the change in P prior average values of $NICT_i(t)$, each calculated on a time window of predetermined duration D.

According to another variant, calculation of the values $DC\_P_i(t)$ is also dependent on the change in M prior values of the result $NICRP(t)$.

According to another variant, calculation of the values $DC\_P_i(t)$ is also dependent on the change in P prior average values of $NICRP(t)$, each calculated over a time window of predetermined duration D.

Advantageously, calculation of the values $DC\_P_i(t)$ is also dependent on the number and the state of vertical polarization $VProc\_P_i$, representing the state of the processors allocated to each of the partitions $P_i$.

"Polarization," within the meaning of the present disclosure, means the parameter described in U.S. Pat. No. 8,015,335 and referring to the number and state of the processors allocated to a resource.

According to a first embodiment, the calculation is made solely for the resources and partitions of the same server.

According to a second embodiment, the calculation is made for the resources and partitions of a plurality of servers.

BRIEF DESCRIPTION OF THE DRAWINGS

The present disclosure will be best understood from a reading of the following description, relating to a non-limitative example embodiment illustrated by the accompanying drawings, where.

DETAILED DESCRIPTION

Hardware Architecture

In mainframe computing systems (for example, the IBM 390 mainframe) the number of partitions is limited, for example, 15 logic partitions. In more recent systems using an architecture of the Z type (registered trade mark), a ceiling is placed on the size of the memory, the input/output interfaces and availability, and the processing power available may be limited to a level below this ceiling.

Figure 1:
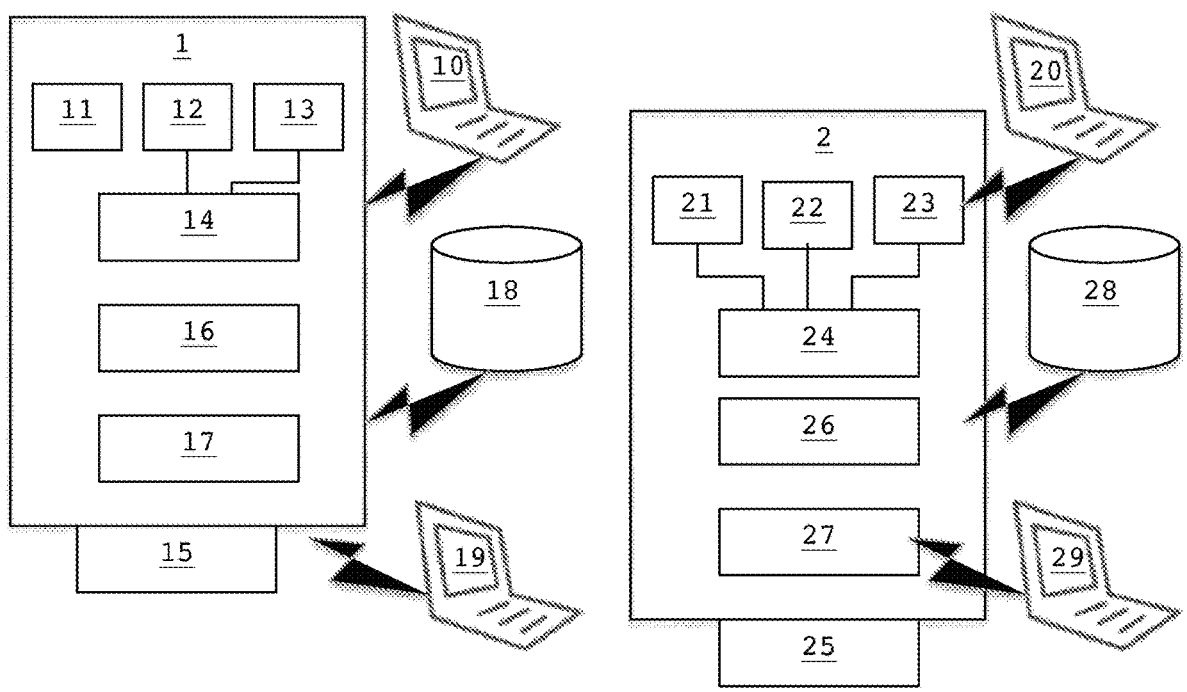
FIG. 1 shows a schematic view of the hardware architecture of a server according to the disclosure.

FIG. 1 shows a schematic view of the hardware architecture of a system according to the disclosure consisting of two servers (1, 2). Naturally, the number of servers may be greater than two.

Each server (1, 2) is partitioned into a plurality of logic partitions that share the hardware resources, in particular, the processor resources. Each processor is characterized by a vertical or horizontal polarization state.

Each server (1, 2) comprises a plurality of processors (11, 12, 13; 21, 22, 23) as well as a processor manager (14, 24) of the PR/SM ("processor resource/system manager") type managing the distribution of the computing power between the logic partitions.

Each server (1, 2) also comprises a supervision unit "support element" (15, 25) that manages the configuration of the server, in particular, the number of processors available, the size of the memory and, more generally, the physical state and the administration of the server by means of consoles (19, 29).

Each server (1, 2) also comprises cards (16, 26) for communication with external memories (18, 28) and network cards (17, 27) for communication with client terminals (10, 20).

Functional Architecture

Figure 2:
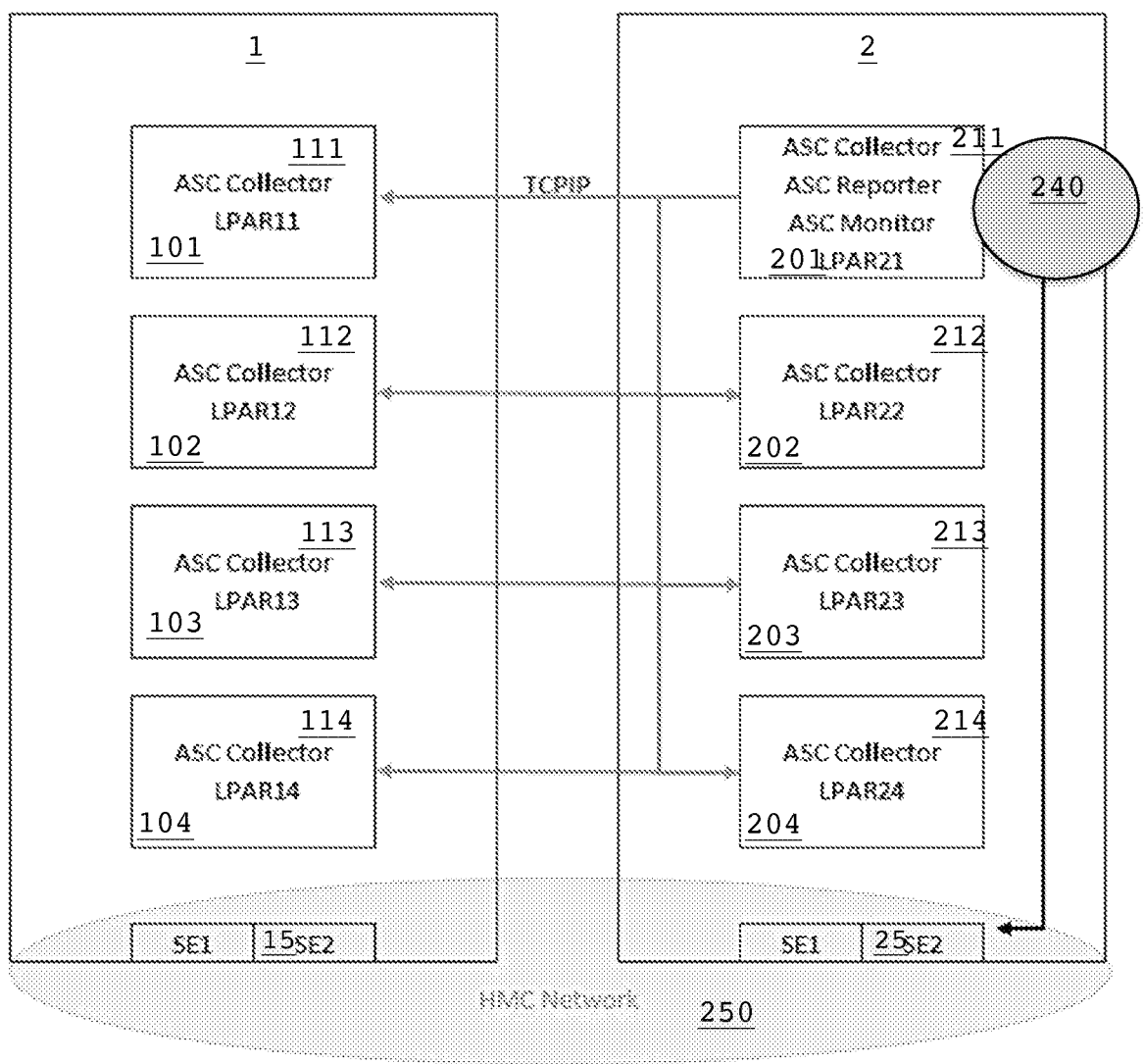
FIG. 2 shows a schematic view of the functional architecture of a server according to the disclosure.

FIG. 2 shows an example of functional architecture.

Each server (1, 2) hosts a plurality of logic partitions (101 to 104; 201 to 204). Each logic partition (101 to 104; 201 to 204) comprises a collector (111 to 114; 211 to 214) that collects "metric" information comprising:

the value of parameters $DC\_P_i(t)$ for setting a ceiling on the capacity of each of the partitions $P_i$ variable over time and recalculated periodically, the result $NICRP(t)$ measuring the instantaneous level of consumption of the processor resources of all the partitions $P_i$, the result $NICT_i(t)$ measuring the instantaneous level of the workloads of each of the partitions $P_i$, and the ceiling state of each of the partitions $P_i$.

This information is calculated from the data available via the operating system by processing operations implemented in each partition.

Figure 3:
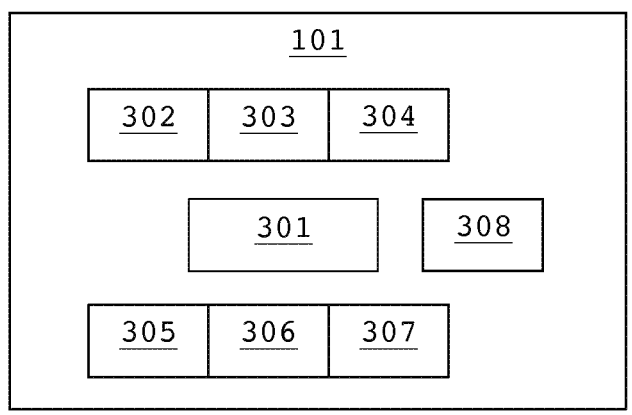
FIG. 3 shows the architecture of a partition and information collection methods.

This information is, for example, recorded in the control blocks of the IBM Z architecture (trade names) as illustrated by FIG. 3, showing the architecture of a partition (101) and the information collection methods. Each partition (101) is associated with a collector (301).

The collector (301) consists of a computer program reading information in the control blocks (302 to 304) concerning the server overall, the logic partition (101), the characterization of the allocation of the processor resources, in particular, in the control blocks (305 to 307) entitled "z/OS workload management (WLM)" in the IBM Z architecture (trade names).

These data are recorded periodically and historized in a memory (308) of the collector (301).

The system comprises either just one monitor (400), or a plurality, generally one per server (1, 2).

Figure 4:
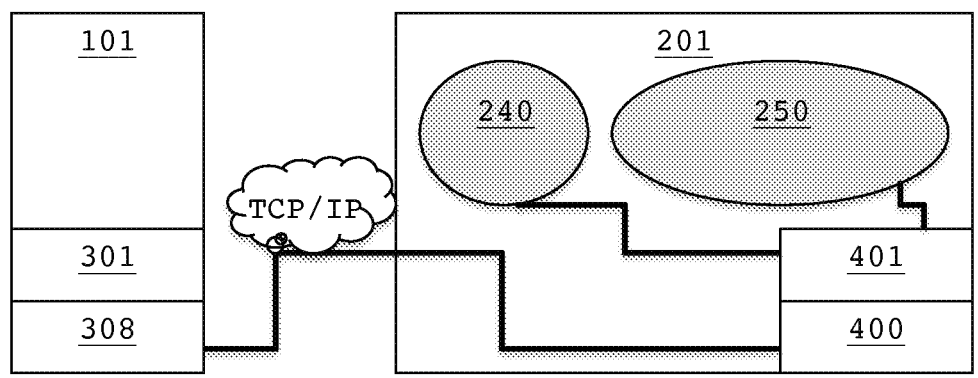
FIG. 4 shows a schematic functional view of a monitor.

The monitor (400) shown in FIG. 4 periodically reads data recorded in the memory (308) of the collectors (301), via a network and a TCP/IP protocol. These data are the subject of processing operations for periodically calculating, for each of the partitions $P_i$, the parameters $DC\_P_i(t)$ for setting a ceiling on the capacity of each of the partitions $P_i$.

This monitor (400) comprises an interfacing module (401), optionally separate, generating the numeric instructions for controlling the application of these ceiling parameters via the PR/SM (Processor Resource/System Manager) hypervisor (14, 24) and the supervision elements (15, 25), in order to periodically modify the power allocated to each of the partitions for which the data were collected and, depending on the configuration of the system, the number of active processors.

Applying these parameters may result in the modification of the processor configuration of the server (1, 2).

This command is sent to the hypervisor (14, 24) in accordance with two possible modes:

the first mode uses the BCPii ("base control program internal interface" (trade name)) application (240) for communicating with the supervision elements (15, 25); and a second mode uses the HMC ("hardware management console") network (250) for communicating with the supervision elements (15, 25).

These data and the identifiers of the modifications are also exploited so as to construct graphical or textural representations representing the change in the system. They may also be exploited to generate electronic messages, or performance information, for example, in accordance with an SMF ("system measurement facility") universal format.

Optionally, the disclosure may also provide means of automatic change or by operating parameter command, for example, according to an event or timetable manager.

It may also provide alert generation means, for example, in the form of electronic messages.

Data Processing

The collected and/or calculated data comprise:

data relating to the servers (1, 2) such as the name, the technical identifier, the type of server, the capacity of the server, the number of physical and logic processors, the number of partitions configured, the sum of the relative weights of the partitions, the sum of the ceiling levels, the sum of the instantaneous consumptions, the sum of the averages over a predetermined time period D, the ratio of the number of physical processors to the number of logic processors, etc.;

data relating to the partitions (101 to 104; 201 to 204) such as the name, the name of the complex (in the "syplex" meaning as disclosed in the note http://www.redbooks.ibm.com/redbooks/pdfs/sg244356.pdf) to which the partition belongs, its relative weight, its ceiling and the state of its ceiling, its instantaneous consumption, the average over a predetermined time period D, the number of logic processors, the change trend of its consumption, etc.;

data relating to the workload management components of each of the partitions (WLM) intended to optimize the load on the machine and network, such as the service classes, the consumption per service class and per period, etc.; and data relating to the number and to the type of polarization (medium, high, low) of the processors, for each of the logic partitions.

Moreover, the processing uses personalizable parameters $K_{user}$ such as:

general parameters such as the collection time interval, the moderating coefficients fixing a minimum threshold of variation in the capacity of each partition, the authorized high and low ceiling thresholds of the server (CPC_MAX, CPC_MIN), etc.;

alert parameters such as thresholds triggering the sending of an electronic message or of an action;

parameters relating to the logic partitions, such as the authorized high and low ceiling thresholds of each partition (MSU_MAX, MSU_MIN), the priority criteria, the safety margin, a reactivity value, an attribute protecting each partition intended to counteract the ceiling according to circumstances defined by the user or calculated automatically, the belonging to a group of logic partitions, etc.; and security keys.

These aforementioned data are the subject of periodic processing for calculating the ceiling of each logic partition, consisting of:

reallocating the capacities between the logic partitions available; and in the case of over-capacity, reallocating the capacities between the real logic partitions and a virtual ("phantom") logic partition in order to reduce the overall ceiling on the servers (1, 2).

To this end, a ceiling limit is fixed for each logic partition, calculated according to the aforementioned high and low thresholds of the partitions (101 to 104; 201 to 204) and of the servers (1, 2), according to the aforementioned parameters $K_{user}$ defined by the user and the collected data.

The invention claimed is:

1. A method for controlling the capacity of use of a partitioned data processing system, or server, the system being configured to have a plurality of logic partitions sharing common physical resources, the method consisting of limiting access to the processor resources of the partitions Pi according to the value of parameters ($DC\_P_i(t)$) for setting a ceiling on the capacity of each of the partitions Pi that are variable over time, wherein the values ($DC\_P_i(t)$) are recalculated periodically according to:

the result of measurement of the instantaneous level of consumption of the processor resources of all the partitions $P_i$ (NICRP(t)), the result of measurement of the instantaneous level of the workloads of each of the partitions $P_i$ (NICTi(t)), the state of placing a ceiling on each of the partitions $P_i$, and at least one parameter determined by the user (K user).

2. The method of claim 1, wherein the calculation of values $DC\_P_i(t)$ is also dependent on the previous value $DC\_P_i(t-n)$.

3. The method of claim 2, wherein the calculation of values $DC\_P_i(t)$ is also dependent on the change in N previous values NICRP(t).

4. The method of claim 2, wherein the calculation of values $DC\_P_i(t)$ is also dependent on the change in P previous average values of $NICT_i(t)$ each calculated over a time window of predetermined duration D.

5. The method of claim 2, wherein the calculation of values $DC\_P_i(t)$ is also dependent on a predictive indicator of change in the average values of $NICT_i(t)$ each calculated over a time window of predetermined duration D.

6. The method of claim 2, wherein the calculation of values $DC\_P_i(t)$ is also dependent on the change in M previous values NICRP(t) of the result.

7. The method of claim 4, wherein the calculation of values $DC\_P_i(t)$ is also dependent on the change in P prior average values of NICRP(t), each calculated over a time window of predetermined duration D.

8. The method of claim 2, wherein the calculation of values $DC\_P_i(t)$ is also dependent on the number and state of vertical polarization $VProc\_P_i$ representing the state of the processors allocated to each of the partitions $P_i$.

9. The method of claim 1, wherein the calculation is carried out only for the resources and partitions of the same server.

10. The method of claim 1, wherein the calculation is carried out for the resources and partitions of a plurality of servers.

11. The method of claim 1, wherein the calculation of values $DC\_P_i(t)$ is also dependent on the change in N previous values NICRP(t).

12. The method of claim 1, wherein the calculation of values $DC\_P_i(t)$ is also dependent on the change in P previous average values of $NICT_i(t)$ each calculated over a time window of predetermined duration D.

13. The method of claim 1, wherein the calculation of values $DC\_P_i(t)$ is also dependent on a predictive indicator of change in the average values of $NICT_i(t)$ each calculated over a time window of predetermined duration D.

14. The method of claim 1, wherein the calculation of values $DC\_P_i(t)$ is also dependent on the change in M previous values NICRP(t) of the result.

15. The method of claim 3, wherein the calculation of values $DC\_P_i(t)$ is also dependent on the change in P prior average values of NICRP(t), each calculated over a time window of predetermined duration D.

16. The method of claim 1, wherein the calculation of values $DC\_P_i(t)$ is also dependent on the number and state of vertical polarization $VProc\_P_i$ representing the state of the processors allocated to each of the partitions $P_i$.

* * * * *